Sept. 17, 1963
S. J. PRICE, JR
3,103,985
REVERSIBLE VEHICLE STEERING MECHANISM
Filed Oct. 3, 1960
3 Sheets-Sheet 1
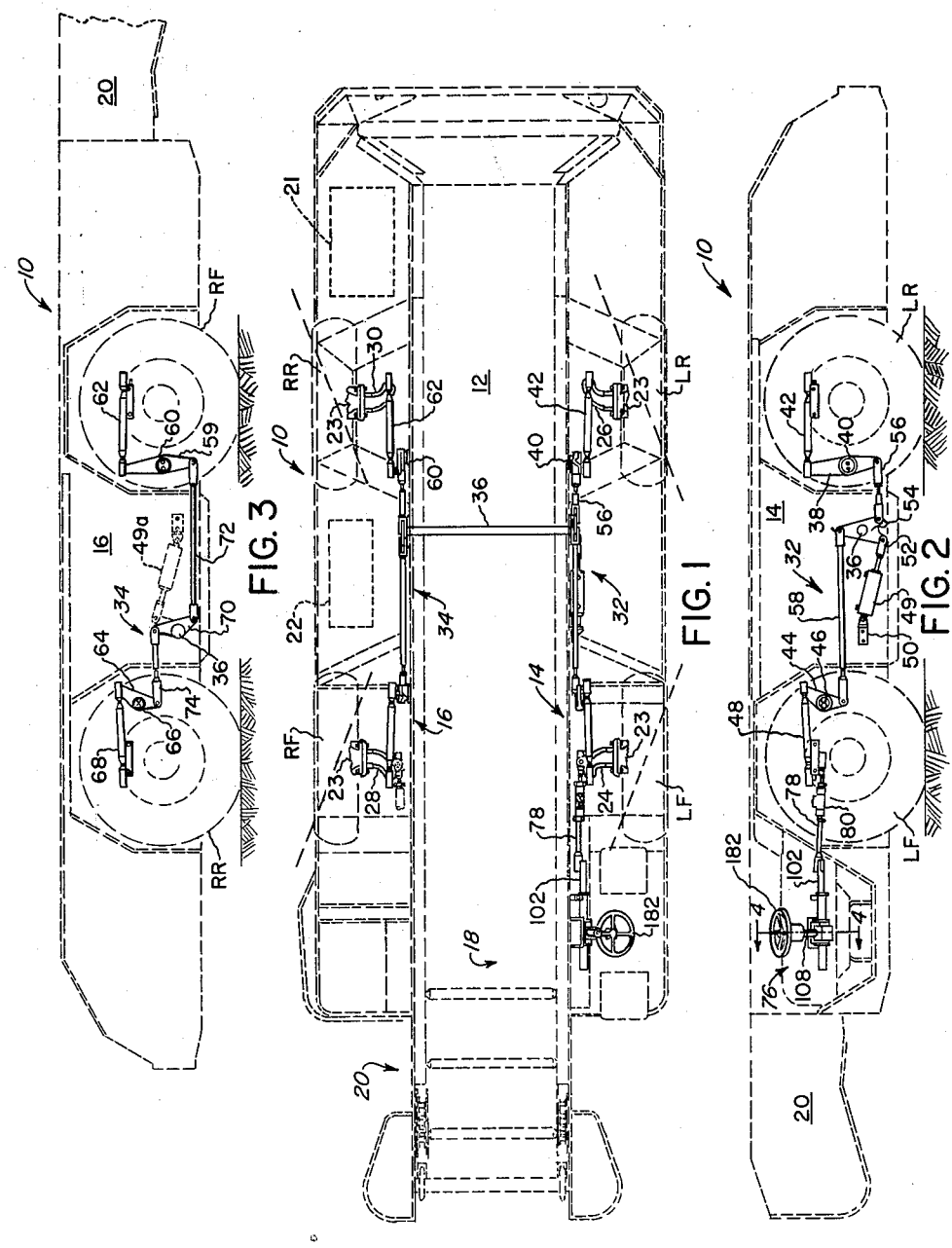
INVENTOR.
STANLEY J. PRICE, JR.

INVENTOR.
STANLEY J. PRICE, JR.

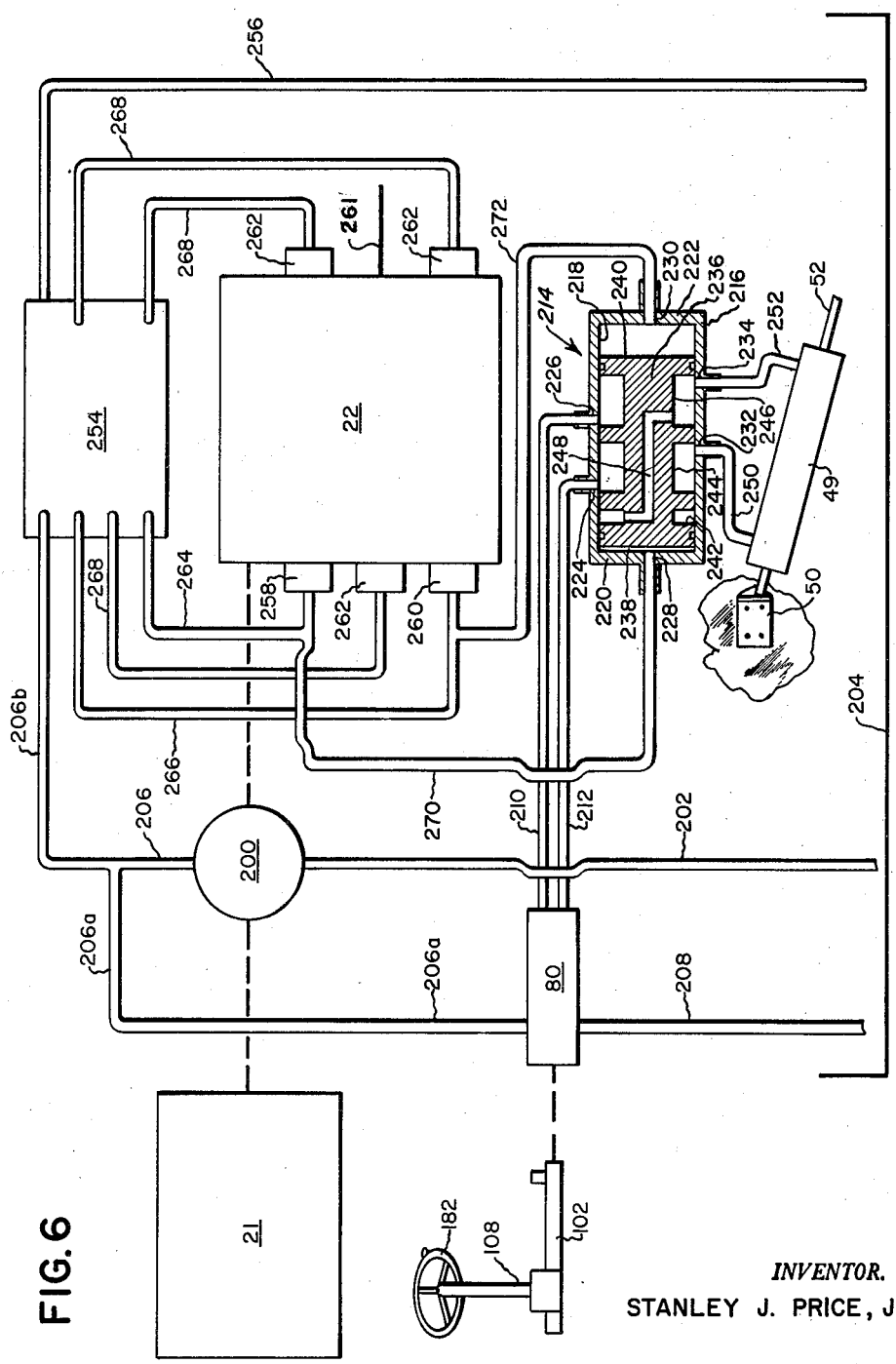

_United States Patent Office_ 3,103,985
Patented Sept. 17, 1963

3,103,985
REVERSIBLE VEHICLE STEERING
MECHANISM
Stanley J. Price, Jr., Pittsburgh, Pa., assignor to Consolidation Coal Company, Pittsburgh, Pa., a corporation of Pennsylvania
Filed Oct. 3, 1960, Ser. No. 59,891
4 Claims. (Cl. 180—45)

The present invention relates to steering mechanisms for reversible vehicles, and more particularly to steering mechanisms which reverse the direction that the wheels of a vehicle are turned for a given movement of the steering wheel when the direction of travel of the vehicle reverses.

In conventional vehicle steering mechanisms, a vehicle steering control, usually a steering wheel, is provided to actuate motion transmitting means which cause the steerable wheels of the vehicle to turn in response to movement of the steering wheel. The response to the movement of the steering wheel is the same no matter in which direction the vehicle is traveling. For example, if the vehicle steering wheel is turned clockwise, when viewed from the top of the vehicle, the steerable wheels of the vehicle may be turned clockwise, when viewed from the top of the vehicle, about vertical steering axes in response to the movement of the steering wheel. This is the condition ordinarily associated with automotive vehicles. The steerable wheels of the vehicle are turned clockwise about their vertical steering axes when the steering wheel is turned clockwise, as viewed from the top of the vehicle, no matter in which direction the vehicle is moving.

In automotive vehicles, where a very small amount of traveling is accomplished in a reverse direction, a conventional steering system may be quite adequate. Further, the travel in the reverse direction of automotive vehicles is usually at relatively slow speeds. Accordingly, there is no problem of loss of control due to steering confusion in automotive vehicles.

In vehicles which travel extensively in both the forward and reverse directions, conventional steering mechanisms may not be adequate. Many vehicles, such as front end loaders, earth loading equipment, and shuttle type haulage vehicles operate substantially the same amount of time traveling in the reverse direction as traveling in the forward direction. On several of these vehicle types, the operator changes position relative to the steering wheel when he operates the vehicle in the reverse direction. Thus, he may have one seat to drive the vehicle in the forward direction which permits him to face forwardly while, when he operates the vehicle in reverse, he may change to a seat which permits him to face rearwardly. Even if the operator does not physically change position, when the vehicle operates in a reverse direction, the operator may mentally change position so that confusion in steering often results with conventional steering mechanisms.

As an example of this condition, consider a vehicle in which, when viewed from the top of the vehicle, a clockwise turn of the steering wheel will turn the steerable wheels of the vehicle clockwise about their vertical steering axes. If the front wheels are the steerable wheels, and the driver is seated behind the steering wheel with the vehicle moving in the forward direction, a clockwise turn of the steering wheel or a turn to the operator's right will result in the vehicle turning to the right. Now, however, if the operator changes position so that he faces rearwardly and the steerable wheels are behind him, movement of the steering wheel in a clockwise direction or to the driver's right will result in a left turn of the vehicle when it is traveling in reverse. It is extremely difficult to condition a driver to turn the steering wheel in the opposite direction to produce the turn which he desires. Furthermore, in periods of stress or emergency, the driver cannot react properly since the steering in the reverse direction is unnatural to him.

The present invention is directed toward steering mechanisms which are adapted to reverse the direction that the wheels of a vehicle are turned for a given movement of the steering wheel when the direction of travel of the vehicle is reversed. Thus, in the example just given, so long as the vehicle was traveling in a forward direction, a clockwise turn of the steering wheel would produce a clockwise rotation of the steerable vehicle wheels about their vertical steering axes. When, however, the vehicle was traveling in the reverse direction, a clockwise turn of the steering wheel would produce a counterclockwise rotation of the steerable wheels about their vertical steering axes.

With the steering mechanisms of the present invention, confusion in steering the vehicle from two different positions is completely eliminated. Further, safety in vehicle operation is enhanced and driver training for the vehicle is facilitated. At the same time, the steering mechanisms of the present invention require relatively minor modification to standard steering mechanisms to produce the desired reversal of movement of motion transferred through the steering mechanism when the vehicle direction of travel is reversed.

Two embodiments of the present invention will be hereinafter described in detail. The first embodiment provides mechanical reversal of the mechanical motion transmitting linkage of a vehicle steering mechanism. The second embodiment provides a reversing valve which reverses the hydraulic lines that connect a hydraulic vehicle steering mechanism to transfer motion hydraulically from the steering wheel to the vehicle steerable wheels. In each of the embodiments the direction of vehicle travel produces a hydraulic signal which actuates the vehicle steering mechanism and causes it to provide the proper direction of movement from the steering wheel to the steerable vehicle wheels.

The invention will be hereinafter described as installed on a four wheel driven and four wheel steered shuttle-type haulage vehicle such as is utilized extensively in the mining industry. The installation of the steering mechanism on this shuttle car is intended to be exemplary only, and the invention is not limited in scope to shuttle cars. The invention may be utilized on any reversing vehicle without regard to the number of steerable wheels.

With the foregoing considerations in mind, it is a primary object of the present invention to provide improved steering mechanisms for reversible vehicles.

Another object of this invention is to provide a steering mechanism in which the direction that the wheels of a vehicle are turned for a given movement of the steering wheel reverses when the vehicle reverses its direction of travel.

Another object of this invention is to provide hydraulically actuated reversible gearing adapted to reverse the steering movement transmitted to the vehicle steerable wheels upon vehicle direction reversal.

Another object of this invention is to provide a hydraulically actuated reversing valve to reverse the hydraulic connections in the hydraulic lines providing motion transmission from a vehicle steering wheel to the steerable wheels of the vehicle.

Another object of this invention is to provide a steering mechanism in which the direction of vehicle travel produces a hydraulic signal to actuate reversing mechanism in the steering unit.

These and other objectives achieved by this invention will become apparent as this description proceeds in conjunction with the accompanying drawings.

In the drawings:

FIGURE 1 is a top plan view of a mine haulage vehicle.

FIGURE 2 is a view in side elevation of the haulage vehicle illustrated in FIGURE 1.

FIGURE 3 is a view in side elevation of the haulage vehicle illustrated in FIGURE 1.

FIGURE 6 is a schematic hydraulic diagram showing a second embodiment of the present invention.

Figure 4:
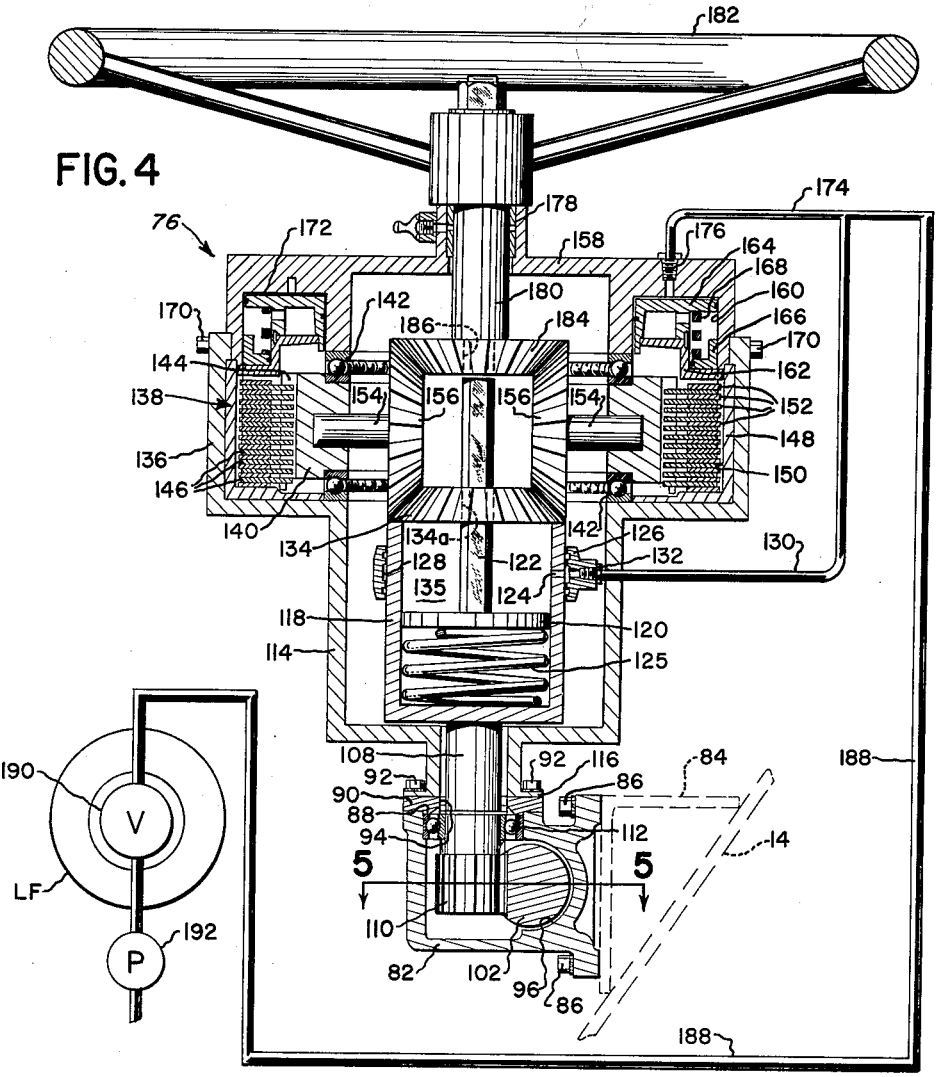
FIGURE 4 is a sectional view in elevation of the steering wheel assembly taken along line 4—4 of FIGURE 2 and illustrating one embodiment of the steering mechanism of this invention.

Although a mine haulage vehicle is operated in either direction with equal facility, for purposes of description the discharge end of the vehicle is designated as the front end. The steering wheel is located adjacent the discharge or front end of the vehicle. Also, the side of the vehicle illustrated in FIGURE 2 will be designated the left side of the vehicle and the side illustrated in FIGURE 3 will be designated as the right side of the vehicle.

The two embodiments of the present invention are illustrated with a great number of common parts. The first embodiment will be described in detail. The second embodiment will be described in detail only insofar as it differs in construction from the first embodiment.

Referring to FIGURES 1, 2 and 3 there is illustrated a mine haulage vehicle with the outline of the mobile body 10 shown in broken lines. The mobile body 10 has a recessed material haulage compartment 12 which extends lengthwise thereof between a pair of vertical side walls 14 and 16. The material haulage compartment 12 has an endless conveyor 18 extending along the bottom thereof. A boom structure 20 is pivotally secured to the front end of the mobile body 10 and is arranged to pivot vertically so that the material carried by the haulage vehicle may be discharged therefrom into other transporting means.

The mobile body is supported and propelled by four wheels designated respectively LF, LR, RF, RR. The letters indicate both the side of the vehicle and the relative position of the wheel in respect to the front and rear ends of the vehicle. For example, LF refers to the left front wheel. All of the wheels are power driven and are also steerable. A prime mover 21 drives the wheels through a transmission mechanism 22. The specific driving connections between the prime mover, the transmission, and the driven wheels of the vehicle form no part of this invention and are not shown. The transmission 22 is preferably of the type disclosed and claimed in Reissue Patent No. 24,327 entitled "Hydraulically Controlled Transmission" issued on June 11, 1957, to A. L. Lee.

The wheels support the mobile body 10 by means of pivoted bracket members (not shown) that have a portion rigidly secured to the respective vehicle side walls and a movable portion connected to the respective wheel. Fragmentary portions of the movable bracket member are illustrated in FIGURE 1 and are designated by the numeral 23. Secured to and extending inwardly from each of the pivoted portions of the bracket members 23 are steering yokes, which although substantially similar in construction, will be designated respectively by numerals 24, 26, 28 and 30 because of their association with the different steerable wheels. Each of the steering yokes has a ball type connecting member (not shown) adapted to receive a mating socket portion of steering link members.

The wheels LF and LR are steered by the left side portion of the steering mechanism generally designated by the number 32. The left side portion of the steering mechanism is illustrated in detail in FIGURES 1 and 2. The wheels RF and RR are steered by means of the right side portion of the steering mechanism generally designated by the numeral 34. The right side portion of the steering mechanism is illustrated in detail in FIGURES 1 and 3. The right and left side portions of the steering mechanism are operatively connected to each other by means of a transverse connecting member 36 in a manner to be later described.

The left side portion of the steering mechanism 32 includes an elongated lever 38 adjacent the rear wheel LR (FIGURE 2). The lever 38 is pivotally secured to the vehicle side wall 14 in a substantially vertical plane by means of a pivot pin 40. A lever 38 is connected at its upper end to the steering yoke 26 by means of a link member 42. As the lever 38 is pivoted about the pivot pin 40 a steering link member 42 and yoke 26 pivot wheel LR about its substantially vertical steering axis. Another lever 44 is pivotally secured to the vehicle side wall 14 adjacent the left front wheel LF by means of a pivot pin 46. The upper portion of the lever 44 is connected to the steering yoke 24 by means of a link member 48. Thus as lever 44 is pivoted about pivot pin 46, the link 48 and yoke 24 pivot the left front wheel LF about its vertical steering axis. The levers 38 and 44 are actuated by means of a servomotor 49. The servomotor 49 is pivotally secured at one end 50 to the vehicle side wall 14 and has an actuating arm 52 extending outwardly from the other end. The actuating arm 52 is connected at its free end to a triangular lever 54 that is rigidly secured to the free end of the transverse connecting member 36.

The transverse connecting member 36 extends through the vehicle side walls 14 and 16 below the bottom of the haulage compartment 12 and is rotatable relative to the vehicle body 10.

The lower portion of the elongated lever 38 is connected to the triangular lever 54 below the transverse connecting member 36 and adjacent the actuating arm 52 by means of a link member 56. The lever 44 is connected to the triangular lever 54 above the transverse connecting rod 36 by a link member 58. With this arrangement when the actuating arm 52 pivots the triangular lever 54 in a clockwise direction as viewed in FIGURE 2, wheel LR through the link member 56, lever 38, link member 42 and steering yoke 26 pivots about its substantially vertical steering axis in a clockwise direction as viewed in FIGURE 1. Simultaneously the wheel LF through the link member 58, lever 44, link member 48 and steering yoke 24 pivots about its steering axis in a counterclockwise direction.

The right side portion of the steering mechanism 34, shown in FIGURES 1 and 3, has an elongated lever 59 located adjacent the right wheel RF. The elongated lever 59 is similar to elongated lever 38 located adjacent the left wheel LR. The lever 59 is pivotally secured to the vehicle side wall 16 by means of a pivot pin 60 adjacent the right front wheel RF. The top portion of lever 59 is connected to steering yoke 30 (FIGURE 1) by a link member 62 so that wheel RF pivots about its steering axis when lever 59 pivots about pin 60. A short lever 64 is pivotally secured to the vehicle side wall 16 adjacent the right wheel RR by a pivot pin 66. The short lever 64 is similar to lever 44 located adjacent the left front wheel LF. The top portion of lever 64 is connected to steering yoke 28 by a link member 68 so that wheel RR pivots about its steering axis when the lever 64 pivots about the pin 66. Another lever 70 is rigidly secured to the other end of the transverse connecting rod 36 and has its lower portion connected to the lower portion of lever 59 by means of a link member 72 so that lever 59 will pivot or rotate about the pivot pin 60 in the same direction as lever 70.

The upper portion of the lever 70 is connected to the lower portion of lever 64 by a link member 74. Thus as viewed in FIGURES 1 and 3 when the transverse connecting member 36 is rotated in a clockwise direction in a horizontal plane the right front wheel RF will rotate in a clockwise direction about its vertical steering axis (FIGURE 1) and the right rear wheel will rotate in a counterclockwise direction about its vertical steering axis. In FIGURE 3 another servomotor 49a is indicated in dotted lines to show that the servomotor may be positioned on either side of the vehicle although only one servomotor is required to actuate the entire steering mechanism.

The servomotor 49 is actuated to provide the desired steering of the wheels by the steering assembly generally designated by the numeral 76. As described thus far, the steering mechanism is common to both embodiments of the present invention. In the following description, the embodiment of FIGURES 4 and 5 will first be described in detail.

The steering wheel assembly 76 is connected to the steering yoke 24 by means of a link member 78 and a valve member 80. The valve member 80 is aligned with the link member 78 and under normal operating conditions is employed to meter hydraulic fluid under pressure to the servomotor 49 to cause movement of servomotor 49 and corresponding movement of the steering linkage. The valve 80 also includes an override mechanism (not shown) that under given conditions may be employed as a portion of the linkage between the steering assembly 76 and yoke 24 to provide a direct mechanical connection between the steering wheel assembly 76 and yoke 24.

Figure 5:
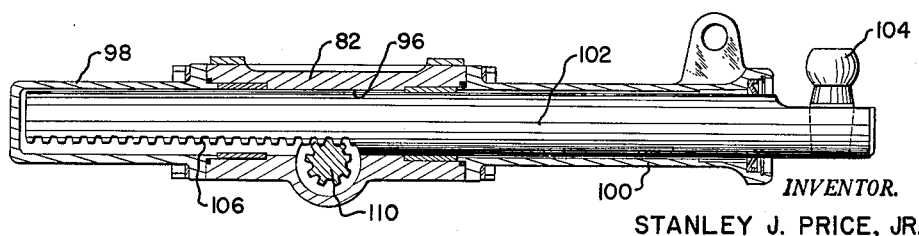
FIGURE 5 is a cross sectional plan view of the steering wheel assembly of FIGURE 4 taken along line 5—5 of FIGURE 4.

The steering wheel assembly 76 is illustrated in detail in FIGURES 4 and 5 and includes a gear housing 82 secured to the vehicle side wall 14 by means of an angle member 84 that is preferably welded to the sloping portion of the vehicle side wall 14. The gear housing 82 is secured to the angle 84 by means of bolts 86 and has an open top portion 88 with a mating cap 90 that is secured to the gear housing 82 by means of bolts 92. The cap member 90 has a vertical aperture 94 therethrough. The gear housing 82 has a horizontal bore 96 extending therethrough. A cup shaped cap member 98 is secured to the gear housing 82 and forms a closure over one end of the horizontal bore 96 (FIGURE 5). A tubular member 100 is axially aligned with the horizontal bore 96 and is secured to the other side wall of the gear housing 82. A rack member 102 is positioned within the horizontal bore 96, the cup shaped member 98 and a tubular member 100 and is arranged to move reciprocally therein. The rack member 102 has a ball joint 104 adjacent one end that is operatively secured to the link member 78 so that movement of the rack member 102 is transmitted to the valve member 80. The rack member 102 has a plurality of gear teeth 106 formed on one side thereof. A vertical steering column 108 extends into the gear housing 82 and has a pinion 110 secured to one end thereof. The column 108 is rotatably supported within the gear housing 82 by means of a bearing 112. A steering housing 114 is arranged coaxially with the steering column 108 and has a lower flange portion 116 that is secured to the gear housing cap member 88. Nonrotatably secured to the steering column 108 within the steering housing 114 is a cylindrical lock housing 118. Lock housing 118 contains a piston 120 which is in sliding sealing relation with the cylindrical lock housing 118. A latch rod 122 which is polygonal in cross section extends axially from the piston 120 to which it is fixed. A radial passage 124 is provided within the cylindrical lock housing 118 to permit hydraulic fluid to enter the lock housing behind piston 120. A helical spring 125 urges the piston 120 upwardly as viewed in FIGURE 4.

An annular member 126 surrounds the cylindrical lock housing 118. Annular member 126 is stationary relative to steering housing 114 and the cylindrical lock housing 118 rotates relative to it. The annular member 126 has an annular recess 128 formed therein so that recess 128 is in constant fluid communication with the passage 124. The hydraulic actuating line 130 communicates with annular recess 128 through the fluid connection 132.

A driven bevel gear 134 is nonrotatably secured to the cylindrical lock housing 118 so that bevel gear 134, lock housing 118 and steering column 108 rotate as a unit. The bevel gear 134 has a polygonal aperture 134a formed therein so that polygonal latch rod 122 passes through aperture 134a. The latch rod 122 reciprocates relative to the bevel gear 134 as piston 120 moves, and the latch rod 122 is provided to sealingly contact the edges of aperture 134a so that a closed chamber 135 is provided above piston 120 to move piston 120 when hydraulic fluid is admitted into the chamber 135 through passage 124.

The steering housing 114 has an enlarged portion 136 which houses an annular friction brake 138. The friction brake 138 includes an annular rotatable member 140 which is rotatably supported within the housing 114 by bearings 142. The rotatable member 140 has a splined external surface 144 which nonrotatably receives a plurality of friction plates 146 that have mating serrated inner peripheries. The annular friction plates 146 may not rotate relative to the rotatable member 140 but are free to move axially relative thereto.

A fixed brake member 148 is nonrotatably secured to the steering housing enlarged portion 136 and has a splined internal surface 150. Splined internal surface 150 nonrotatably receives a plurality of annular friction plates 152 that have mating serrated outer peripheries. The friction plates 152 may not rotate relative to the fixed member 148 but are free to move axially relative thereto. The friction plates 146 and the friction plates 152 are alternately interleaved with each other.

The brake rotatable member 140 has a plurality of stub shafts 154 extending radially inwardly therefrom. Rotatably supported by each of the stub shafts 154 is a bevel idler gear 156. Bevel idler gears 156 are in meshing relation with the driven bevel gear 134 nonrotatably secured to the cylindrical lock housing 118.

An annular housing cover 158 is adapted to cover the top of steering housing enlarged portion 136. Housing cover 158 has an annular recess 160 formed therein. Recess 160 contains a brake actuating member 162 that protrudes axially from recess 160. An annular brake actuating piston 164 is slidingly and sealingly disposed within recess 160 and is axially secured to the brake actuating member 162. An annular abutment member 166 is axially and nonrotatably secured to the housing cover 158 between the annular piston 164 and the brake actuating member 162. A helical spring 168 abuts the abutting member 166 and the piston 164 and urges the piston axially away from the abutting member 166. Bolts 170 are provided to secure the housing cover 158 to the housing enlarged portion 136.

The annular chamber 172 within annular recess 160 behind the annular actuating piston 164 is connected to hydraulic actuating line 174 through a fluid connection 176. When hydraulic fluid under pressure is conducted to chamber 172 the actuating piston 164 is urged into contact with brake actuating member 162, which in turn axially engages the annular friction plates 146 to annular friction plates 152 and prevents relative rotation between the brake fixed member 148 and the rotatable member 140. When fluid is vented from the chamber 172, spring 168 returns the actuating piston 164 so that the annular friction plates are not in engagement with each other and the rotatable member 140 is free to rotate relative to the fixed member 148.

The housing cover 158 supports a bushing 178 which permits a steering wheel shaft 180 to be journaled for rotation relative to the housing cover 158. A steering wheel 182 is nonrotatably secured to the steering wheel shaft 180. At the other end of shaft 180, a bevel drive gear 184 is nonrotatably secured thereto. Bevel drive gear 184 meshes with idler gears 158. A polygonal recess 186 is formed within the bevel drive gear 184 so that recess 186 may nonrotatably receive the latch rod 122 and thereby nonrotatably lock the steering wheel shaft 180 to the steering column 108.

Hydraulic actuating lines 130 and 174 are connected to a main hydraulic actuating line 188. Line 188 contains a directional valve 190 which may be of any suitable, commercially available type. A source of pressurized fluid 192 is provided to feed hydraulic fluid under pressure through actuating line 188 when valve 190 is opened. The source of fluid 192 is shown as a pump which may be driven by any convenient component of the vehicle, such as transmission 22 (FIGURE 1).

The directional valve 190 is connected to any part of the vehicle which will give an indication of the direction of travel of the vehicle. As illustrated schematically in FIGURE 4, the valve 190 is connected to the left front wheel LF and is arranged so that when the wheel LF is rotating so that vehicle 10 is traveling in the forward direction, the valve 190 is closed. When the wheel is rotating so that the vehicle is traveling in the reverse direction, valve 190 is open and fluid is allowed to pass through hydraulic actuating line 188. The directional valve 190 could also be connected to the transmission output shaft which would give an indication of direction of vehicle travel.

With the foregoing arrangement of the components in mind, the operation of the steering mechanism of FIGURES 1 through 5 may be considered in detail. When the vehicle is traveling in a forward direction, the directional valve 190 closes conduit 188 and no hydraulic fluid is conducted through passage 124 into the lock housing chamber 135 nor is any hydraulic fluid conducted into the annular chamber 172 behind actuating piston 164. Accordingly, the inner rotatable member 140 of the brake is free to rotate relative to the fixed member 148, and the helical spring 125 urges the polygonal latch member 122 into bevel gear recess 186 so that the steering wheel shaft 180 is nonrotatably locked to the steering column 108.

Under these conditions, clockwise rotation of the steering wheel 182, as viewed in FIGURE 1 will cause the rack 102 to move rearwardly and cause the wheels LF and RF to move in a clockwise direction as viewed in FIGURE 1 about their vertical steering axes. Likewise, the wheels LR and RR will move in a counterclockwise direction about their vertical steering axes.

When the vehicle moves in a reverse direction, the valve 190 will be opened so that hydraulic fluid under pressure can pass through actuating conduit 188 into chamber 172 and into the lock housing 118. When pressurized fluid passes into the chamber 172 and lock housing 118, the rotatable portion 140 of the friction brake is frictionally engaged to the fixed member 148. Likewise, the polygonal latch member 122 is withdrawn from recess 186 so that steering wheel shaft 180 is free to rotate relative to steering column 108.

Under these conditions, when the steering wheel 182 is turned in the clockwise direction, the steering column 108 is driven in the counterclockwise direction through bevel gears 184, 156 and 134. Accordingly, when the wheel is turned in the clockwise direction as viewed in FIGURE 1, the rack now moves forwardly and the wheels LF and RF move in a counterclockwise direction about their vertical steering axes. Likewise, the wheels LR and RR move in a clockwise direction about their vertical steering axes.

With this arrangement, it can be seen that if the driver is seated behind steering wheel 182 facing forwardly and the vehicle is moving in a forward direction, his rotation of the wheel clockwise or to his right will cause the portion of the vehicle which he is facing to move to the right. If, on the other hand, he is seated in front of the wheel 182 facing rearwardly and the vehicle is moving in the reverse direction, rotation of the wheel clockwise or to his right will also cause the portion of the vehicle which he is facing to move to the right. Thus, the turning of wheel by the vehicle operator in the natural direction will result in proper steering of the haulage vehicle.

The steering assembly rack member 102 when actuated moves longitudinally and is physically connected to the steering mechanism left side portion 32 through an override mechanism (not shown). Likewise, if hydraulic fluid pressure should be lost, the latch rod 122 locks the steering shaft 180 directly to the steering column 108 so that steering column 108 may be turned by the operator. Thus, the operator of the vehicle may manually control the steering mechanism even if hydraulic pressure is lost and the servo mechanism 49 becomes inoperative.

Referring to FIGURES 1, 2, 3 and 6, a second embodiment of the present invention will be described in detail. In the second embodiment, the linkage shown in FIGURES 1, 2 and 3 is identical to that of the first embodiment. However, the steering wheel 182 is directly connected to the steering column 108 rather than being connected through reverse gearing. Accordingly, the steering motion between the steering wheel 182 and the rack 102 is not reversible. In the second embodiment, the link 78 which connects to the valve 80 causes the valve 80 to meter fluid to the servo mechanisms 49 in conventional fashion. An overriding mechanical linkage (not shown) is provided so that during normal operation the movement of the steering wheel 182 is transmitted hydraulically through valve 80 to servo mechanism 49, whereas if hydraulic failure should occur, the overriding linkage provides a direct mechanical connection between the steering wheel assembly 76 and the steering yoke 24. The overriding mechanical linkage may take the form of a slotted link operatively connected to the yoke 24 of the wheel LF which receives an actuating pin operatively connected to the rack 102. So long as the hydraulic steering mechanism is functioning normally, the pin reciprocates within the link, as the rack member moves to steer the vehicle, but never contacts the ends of the link so that no motion is transmitted from the pin to the link. If, however, the hydraulic steering mechanism should fail, the pin could be moved into engagement with either end of the slotted link by additional rotation of the steering wheel so that a mechanical motion transmission could be accomplished from the rack 102 through the pin and slotted link to the yoke 24 of wheel LF.

Referring particularly to FIGURE 6, a steering wheel 182 is shown directly connected to the steering column 108 and steering column 108 drives the rack 102 through a pinion fixed to the steering column. Rack 102 is mechanically connected to the metering value 80. The prime mover 21 is shown mechanically connected to the transmission 22, each of which are shown schematically, through the fluid pump 200. Accordingly, fluid pump 200 is driven to provide a source of fluid pressure for operating the mechanism of FIGURE 6.

Fluid is drawn into pump 200 through suction conduit 202 from a fluid reservoir 204. Pressurized fluid from pump 200 leaves the pump through pressure conduit 206 which has two branches 206a and 206b. Branch conduit 206a connects the pressure conduit 206 with the steering metering valve 80. A vent conduit 208 permits venting of fluid from the metering valve 80 to reservoir 204 under specified conditions of operation. A pair of hydraulic lines 210 and 212 join the metering valve 80 to a reversing valve 214.

The metering valve 80 is conventional in all respects. It forces fluid through hydraulic lines 210 or 212 in response to movement by rack member 102. The amount of fluid forced is in direct relation to the amount of movement of rack member 102. Likewise, the hydraulic line 210 or 212 through which the fluid is forced is determined by the direction of movement of the rack member 102. In conventional steering mechanisms, the hydraulic lines 210 and 212 are connected directly to a double acting servomotor. Accordingly, when pressure is conducted through line 210 the servomotor is forced in one direction and when pressure is conducted through line 212 the servomotor is forced in the other direction. When one of the hydraulic lines 210 or 212 serves as a pressure line, the other is connected directly to vent line 208 to vent fluid from the servomotor to the reservoir 204.

In the present invention, the reversing valve 214 is interposed between the metering valve 80 and the servomotor 49. Reversing valve 214 has a body member 216 that has a cylindrical internal cavity 218. The body portion 216 has an end wall 220 and an end wall 222. Located in the body portion 216 are pressurized fluid inlets 224 and 226. An actuating inlet 228 is formed in end wall 220 and an actuating inlet 230 is formed in end wall 222. Fluid outlets 232 and 234 are formed in the body portion 216. A cylindrical valve spool 236 is slidingly and sealingly positioned within the body portion internal cavity 218. The spool has planar end walls 238 and 240 formed at each of its ends. Between end walls 238 and 240, the spool has annular recesses 242, 244, and 246 formed in spaced relation on its cylindrical surface. An internal passage 248 formed within spool 236 permits fluid communication between annular recess 242 and annular recess 246.

The reversing valve 214 is actuated by hydraulic actuating pressure entering the actuating inlets 228 or 230. As shown in FIGURE 6, the valve spool has been moved so that it is adjacent body portion end wall 220. This is a position which would occurs if fluid pressure entered inlet 230 and acted upon the spool end wall 240. With the valve spool 236 in the position shown in FIGURE 6, pressurized fluid inlet 224 communicates with the annular recess 244 in spool 236 as does the outlet 232. Accordingly, inlet 224 is in fluid communication with outlet 232. Likewise, pressurized fluid inlet 226 is in communication with annular recess 246 as is outlet 234 so that inlet 226 is in fluid communication with outlet 234.

Pressurized fluid inlets 224 and 226 and the outlets 232 and 234 are so positioned on the valve body 216 that when the spool is moved axially adjacent the body portion end wall 222, as would occur if fluid under pressure were admitted through actuating inlet 228 to act upon the end wall 238 of spool 236, the pressurized fluid inlet 224 would communicate with annular recess 242. The pressurized fluid inlet 226 would communicate with the annular recess 244 as would the outlet 232. Accordingly, inlet 226 and outlet 232 would be in fluid communication. The outlet 234 would continue to communicate with the annular recess 246. With inlet 224 in communication with recess 242 and outlet 234 in communication with recess 246, fluid communication would be established between inlet 224 and outlet 234 through the internal passage 248 formed in spool 236. It may be seen that with the spool in the position shown in FIGURE 6, inlet 224 and outlet 232 communicate with each other as do inlet 226 and outlet 234. With the spool moved to the other axial position, inlet 224 communicates with outlet 234 while inlet 226 communicates with outlet 232.

A hydraulic line 250 joins reversing valve outlet 232 to one end of the servomotor 49. A hydraulic line 252 joins reversing valve outlet 234 to the other end of servomotor 49.

With the reversing valve in the position shown in FIGURE 6, motion of the rack 102 to the right would cause the servomotor 49 to operate in a first direction through the motion metering valve 80 and through hydraulic lines 210, 212, 250 and 252. With the reversing valve spool moved so that it was adjacent the body portion end wall 222, motion of the rack member 102 to the right as viewed in FIGURE 6 would cause movement of the servomotor 49 in a second direction, opposite to the first direction so that while the steering wheel was moved in the same direction in each case, the motion of the vehicle wheels would be opposite due to the movement of the servomotor 49.

In order to properly actuate the reversing valve 214 to cause proper reversal of the motion transfer from the steering wheel 182 to the servomotor 49, a tie-in with the vehicle transmission is provided. The transmission is preferably of the type disclosed and claimed in the aforesaid Lee Reissue Patent No. 24,327. To control the transmission 22, a transmission programming valve 254 is provided. Transmission programming valve 254 receives fluid pressure through branch conduit 206b from the source of pressure 200. A vent line 256 is provided to vent pressurized fluid from the valve 254 under certain conditions of operation. As discussed in the aforesaid reissue patent, the transmission 22 has a plurality of fluid actuated clutches each of which may be selectively engaged to provide the transmission speed ratios and directions. A forward directional clutch 258 and a reverse directional clutch 260 control the direction of operation of the transmission. When clutch 258 is engaged along with a speed change clutch, the transmission output shaft 261 rotates in the forward direction. When the reverse directional clutch 260 is engaged along with a speed change clutch, the output shaft 261 rotates in the reverse direction. A plurality of change speed clutches 262 are provided to produce the different speed ratios in the forward or reverse direction. Thus, when the forward directional clutch 258 and one of the speed ratio clutches 262 is engaged transmission output shaft 261 rotates in the forward direction at a first speed ratio whereas if another of the speed ratio clutches is engaged and the first clutch 262 is disengaged the output shaft 261 rotates at another given speed ratio.

The programming valve 254 may be positioned to connect the pressure branch conduit 206b to the forward clutch conduit 264 or to the reverse clutch conduit 266. It may also be positioned to connect the pressurized fluid branch 206b to any of the change speed clutch conduits 268. Thus, fluid under pressure may be conducted from the branch conduit 206b through the programming valve 254 to either the forward or reverse clutch and to any one of the change speed clutches. When the branch conduit 206b is so connected through the programming valve, the clutches not pressurized are connected to the vent conduit 256 so that they are not actuated. The exact construction of the programming valve forms no part of the present invention, and it is indicated schematically on FIGURE 6.

A reversing valve actuating conduit 270 connects the forward directional clutch 258 to the reversing valve actuating inlet 228. The reversing valve actuating conduit 272 connects the reverse directional clutch 260 to the reversing valve actuating inlet 230.

With the foregoing arrangement of the components in mind, the operation of the embodiment of the invention of FIGURES 1, 2, 3 and 6 may be considered in detail. When the vehicle is to be driven in a reverse direction, the transmission programming valve 254 is positioned so that pressurized fluid is conducted to reverse directional clutch 260. When the programming valve is so positioned, pressurized fluid is also conducted through the actuating conduit 272 to the actuating inlet 230 of reversing valve 214. With the pressurized fluid so conducted, the valve spool 236 is moved to the left as viewed in FIGURE 6 to the position shown in FIGURE 6. Accordingly, when the vehicle steering wheel 182 is turned so that the rack member 102 is moved to the right, the metering of fluid from steering metering valve 80 passes through hydraulic lines 210, 212, 250 and 252 to the servomotor 49 causing the servomotor 49 to move the actuating arm 52 in a first direction.

If the vehicle is to be moved in the forward direction, the programming valve 254 is positioned so that reverse directional clutch 260 is vented through conduit 256 and forward directional clutch 258 is provided with pressurized fluid from pressure conduit 206b. Accordingly, fluid under pressure will pass through actuating conduit 270 to the actuating inlet 228 of reversing valve 214. The spool will then be forced to the right as viewed in FIGURE 6 until it is adjacent to end wall 222. With the spool so positioned, movement of the wheel 182 which causes movement of the rack 102 to the right as viewed in FIGURE 6 will cause operation of the servomotor 49 so that actuating arm 52 moves in a second direction opposite to the first direction. It should be noted that the reversing valve 214 causes the directional motion transmitted hydraulically from the rack 102 to the servomotor 49 to be reversed when the reversing valve is actuated by one or the other of the conduits from the transmission clutches. Accordingly, the actuating conduits from the transmission clutches provide a sensing means to indicate the direction of vehcile travel.

It should be noted that the invention consists broadly of a reversible motion transmitting means between the steering wheel of the vehicle and the steerable wheels of the vehicle that may be reversed upon actuation. Actuating means are provided which sense the direction of the vehicle and appropriately actuate the reversible motion transmitting means.

In the embodiment of FIGURES 1, 2, 3, 4 and 5, the reversible motion transmitting means is the reversible gearing in the steering wheel column itself. In the embodiment of FIGURES 1, 2, 3, and 6 the reversible motion transmitting means is the reversing valve which permits crossing or reverse connection of the hydraulic motion transmitting lines from the metering valve 80 to the servomotor 49. In the embodiment of FIGURES 1-5, the direction sensing means is a directional valve 190 which operates to open when the vehicle moves in a reverse direction but which remains closed when the vehicle moves in a forward direction. In the embodiment of FIGURES 1, 2, 3 and 6, the actuating means are the conduits joining the directional clutches of the transmission to the actuating inlets on the reversing valve.

It should be noted that the actuating means of FIGURE 6, that is the conduits from the reverse and forward directional clutches, could be utilized to actuate the reversible motion transmitting means of the embodiment of FIGURE 4. Thus, a conduit from reverse directional clutch 260 which extended directly to and communicated with hydraulic line 188 would cause the proper reversal of the steering mechanism of FIGURES 1-5.

Likewise, with only minor modification, a directional valve such as valve 190 could be modified to conduct pressurized fluid to either end of reversing valve 214 upon corresponding motion of the vehicle.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A steerable vehicle adapted to travel in the forward or reverse direction comprising a plurality of steerable wheels, steering control means, motion transmitting means connecting said steering control means and said steerable wheels, said motion transmitting means adapted to selectively transmit motion in a predetermined direction of said steering control means to said steerable wheels to turn said steerable wheels in either a first or a second direction, a source of pressurized fluid, a vehicle transmission having pressurized fluid actuated forward and reverse clutches selectively engageable to propel said veihcle in said forward or reverse direction respectively, conduit means connecting said clutches to said source of pressurized fluid, reversing valve means associated with said motion transmitting means and adapted to be actuated by pressurized fluid, a first actuating conduit connecting said transmission reverse clutch to said reversing valve means, a second actuating conduit connecting said transmission forward clutch to said reversing valve means, said reversing valve constructed and arranged to cause said motion transmitting means to transmit said motion in said predetermined direction of said steering control means to said steerable wheels in said first direction when said reversing valve is actuated by pressurized fluid flowing through said first actuating conduit from said reverse clutch and to transmit said motion in said predetermined direction of said steering control means to said steerable wheels in said second direction when said reversing valve is actuated by pressurized fluid flowing through said second actuating conduit from said forward clutch.

2. A steerable vehicle adapted to travel in the forward or reverse direction comprising a plurality of steerable wheels, steering control means, motion transmitting means connecting said steering control means and said steerable wheels, said motion transmitting means including a hydraulic metering valve controlled by said steering control means, a reversing valve having first and second pressurized fluid inlets, first and second pressurized fluid outlets, and first and second actuating conduit inlets, a hydraulic servomotor, having first and second hydraulic inlets, mechanically connected to said steerable wheels, a first hydraulic line connecting said metering valve to said reversing valve first pressurized fluid inlet, a second hydraulic line connecting said metering valve to said reversing valve second pressurized fluid inlet, a third hydraulic line connecting said reversing valve first pressurized fluid outlet to said servomotor first inlet, a fourth hydraulic line connecting said reversing valve second pressurized fluid outlet to said servomotor second inlet, said motion transmitting means adapted to selectively transmit motion in a predetermined direction of said steering control means to said steerable wheels to turn said steerable wheels in either a first or a second direction, a source of pressurized fluid, a vehicle transmission having pressurized fluid actuated forward and reverse clutches selectively engageable to propel said vehicle in said forward or reverse direction respectively, conduit means connecting said clutches to said source of pressurized fluid, actuating means associated with said motion transmitting means and adapted to actuate said reversing valve, said actuating means including a first actuating conduit connecting said transmission forward clutch to said reversing valve first actuating conduit inlet, a second actuating conduit connecting said transmission reverse clutch to said reversing valve second actuating conduit inlet, said reversing valve constructed and arranged to provide fluid communication between said first and third hydraulic lines and between said second and fourth hydraulic lines to transmit said motion in said predetermined direction of said steering control means to said steerable wheels in said first direction when said reversing valve is actuated by pressurized fluid flowing through said first actuating conduit from said forward clutch and constructed and arranged to provide fluid communication between said first and fourth hydraulic lines and between said second and third hydraulic lines to transmit said motion in said predetermined direction of said steering control means to said steerable wheels in said second direction when said reversing valve is actuated by pressurized fluid flowing through said second actuating conduit from said reverse clutch.

3. A steerable vehicle adapted to travel in the forward or reverse direction comprising a plurality of steerable wheels, steering control means, motion transmitting means connecting said steering control means and said steerable wheels, said motion transmitting means including a hydraulic metering valve controlled by said steering control means, a reversing valve having first and second pressurized fluid inlets, first and second pressurized fluid outlets, and first and second actuating conduit inlets, said reversing valve including a body portion having first and second end walls and a cylindrical internal opening, a cylindrical spool slidingly and sealingly disposed within said opening for axial movement relative to said valve body portion, said spool having first, second and third annular recesses formed therein, an internal passage formed in said spool and connecting said first and third annular recesses, said first and second actuating conduit inlets each being in fluid communication with one end of said spool so that said spool is urged axially relative to said body portion when pressurized fluid is introduced into one of said actuating conduit inlets, said pressurized fluid inlets and outlets arranged in said body portion so that when said spool is positioned adjacent said first end wall, said first pressurized fluid inlet and said second pressurized fluid outlet communicate with said spool second annular recess and said second pressurized fluid inlet and said first pressurized fluid outlet communicate with said spool third annular recess, and when said spool is positioned adjacent said second end wall, said first pressurized fluid inlet communicates with said spool first annular recess, said second pressurized fluid inlet and said second pressurized fluid outlet communicate with said spool second annular recess, and said first pressurized fluid outlet communicates with said spool third annular recess, a hydraulic servomotor, having first and second hydraulic inlets, mechanically connected to said steerable wheels, a first hydraulic line connecting said metering valve to said reversing valve first pressurized fluid inlet, a second hydraulic line connecting said metering valve to said reversing valve second pressurized fluid inlet, a third hydraulic line connecting said reversing valve first pressurized fluid outlet to said servomotor first inlet, a fourth hydraulic line connecting said reversing valve second pressurized fluid outlet to said servomotor second inlet, said motion transmitting means adapted to selectively transmit motion in a predetermined direction of said steering control means to said steerable wheels to turn said steerable wheels in either a first or a second direction, a source of pressurized fluid, a vehicle transmission having pressurized fluid actuated forward and reverse clutches selectively engageable to propel said vehicle in said forward or reverse direction respectively, conduit means connecting said clutches to said source of pressurized fluid, actuating means associated with said motion transmitting means and adapted to actuate said reversing valve, said actuating means including a first actuating conduit connecting said transmission forward clutch to said reversing valve first actuating conduit inlet, a second actuating conduit connecting said transmission reverse clutch to said reversing valve second actuating conduit inlet, said reversing valve constructed and arranged to provide fluid communication between said first and third hydraulic lines and between said second and fourth hydraulic lines to transmit said motion in said predetermined direction of said steering control means to said steerable wheels in said first direction when said reversing valve is actuated by pressurized fluid flowing through said first actuating conduit from said forward clutch and constructed and arranged to provide fluid communication between said first and fourth hydraulic lines and between said second and third hydraulic lines to transmit said motion in said predetermined direction of said steering control means to said steerable wheels in said second direction when said reversing valve is actuated by pressurized fluid flowing through said second actuating conduit from said reverse clutch.

4. A pressurized fluid actuated reversing valve for selectively providing fluid communication of first and second pressurized fluid inlets with first and second outlets respectively or of said first and second pressurized fluid inlets with said second and first outlets respectively, said reversing valve comprising a body portion having first and second end walls and a cylindrical internal opening, a cylindrical spool slidingly and sealingly disposed within said opening for axial movement relative to said valve body portion, said spool having first, second and third annular recesses formed therein, an internal passage formed in said spool and connecting said first and third annular recesses, first and second actuating inlets formed in said body portion first and second end walls respectively, said first and second actuating inlets each being in fluid communication with one end of said spool so that said spool is urged axially relative to said body portion when pressurized fluid is introduced into one of said actuating inlets, said first and second pressurized fluid inlets and said first and second outlets arranged in said body portion so that when said spool is positioned adjacent said first end wall, said first pressurized fluid inlet and said first outlet communicate with said spool second annular recess and said second pressurized fluid inlet and said second outlet communicate with said third annular recess, and when said spool is positioned adjacent said body portion second end wall, said first pressurized fluid inlet communicates with said spool first annular recess, said second pressurized fluid inlet and said first pressurized fluid outlet communicate with said spool second annular recess, and said second pressurized fluid outlet communicates with said spool third annular recess.

References Cited in the file of this patent

UNITED STATES PATENTS

| | | |
|---|---|---|
| 1,544,775 | Placek | July 7, 1925 |
| 1,641,802 | Danly | Sept. 6, 1927 |
| 2,020,951 | Lemon | Nov. 12, 1935 |
| 2,461,116 | Jeffrey | Feb. 8, 1949 |
| 2,901,846 | Armington | Sept. 1, 1959 |